Feb. 12, 1935. H. THIEMANN 1,990,922
CLINICAL THERMOMETER
Filed Jan. 18, 1934

WITNESSES
Otto Krause
W. H. Hahn

INVENTOR
Henry Thiemann

Patented Feb. 12, 1935

1,990,922

UNITED STATES PATENT OFFICE 1,990,922

CLINICAL THERMOMETER

Henry Thiemann, Reedsburg, Wis.

Application January 18, 1934, Serial No. 707,122

1 Claim. (Cl. 73—52)

The invention relates to improvements in a clinical thermometer in which a light absorbent shield is placed in back of the mercury column and having scale markings etched completely through said shield.

Figure 4:
Figure 1:
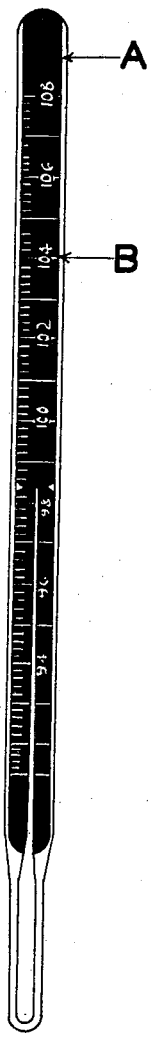
Figure 2:
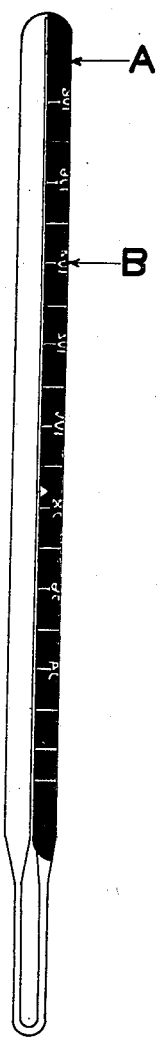
Figure 3:

One form of the invention is illustrated in the accompanying drawing, in which Figure 1 is a front view of the thermometer, Figure 2 a side view, Figure 3 a rear view, and Figure 4 a top cross-section. In all views (A) represents the light absorbent shield, and (B) the scale markings etched through said shield.

In the description given above, the improvement consists of greater visibility of scale readings, figures and graduations in that a combination of scale markings etched through said light absorbent shield, with mercury column in front of said light absorbent shield, makes for greater ease of reading than now is the case in all clear or light opalescent glass thermometers with the scale markings in front of the mercury column, as in the conventional thermometer.

I am aware that prior to my invention clinical thermometers have been made with light absorbent backing. I, therefore, make no claim to this feature, but I claim:

The combination in a clinical thermometer of a light absorbent shield placed in back of the mercury column and having scale markings etched completely through said shield.

HENRY THIEMANN.